INVENTORS
RICHARD K. DAVIS
FRANCIS M. BAILEY
BY J T Cafott
ATTORNEY

Feb. 9, 1965 R. K. DAVIS ETAL 3,169,242

IDENTIFICATION INTERROGATING SYSTEM

Filed March 19, 1963 9 Sheets-Sheet 2

INVENTORS
RICHARD K. DAVIS
FRANCIS M. BAILEY

BY [signature]

ATTORNEY

FIG. 4
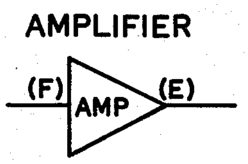
FIG. 4A
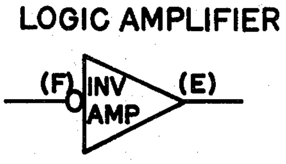
FIG. 4B
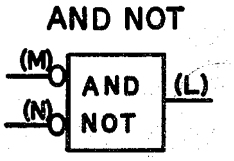
FIG. 4C
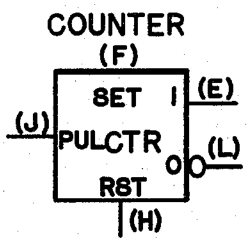
FIG. 4D
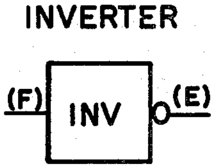
FIG. 4E
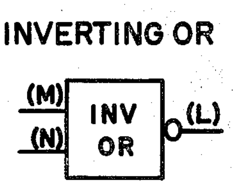
FIG. 4F
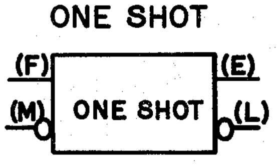
FIG. 4G
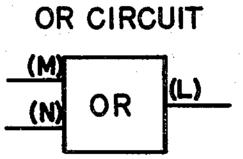
FIG. 4H
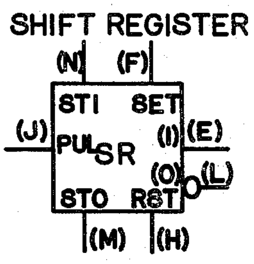
FIG. 4I
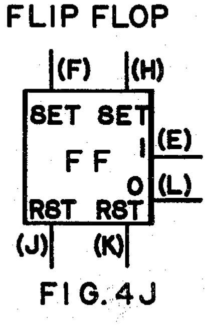
FIG. 4J
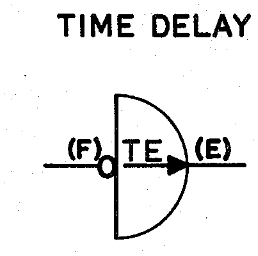
FIG. 4K
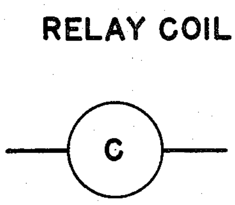
FIG. 4L
INVENTORS
RICHARD K. DAVIS
FRANCIS M. BAILEY
BY [signature]
ATTORNEY

INVENTORS
RICHARD K. DAVIS
FRANCIS M. BAILEY
BY
ATTORNEY

INVENTORS
RICHARD K. DAVIS
FRANCIS M. BAILEY
BY
J T Conforto
ATTORNEY

INVENTORS
RICHARD K. DAVIS
FRANCIS M. BAILEY
BY
ATTORNEY

IDENTIFICATION INTERROGATING SYSTEM

Filed March 19, 1963 9 Sheets-Sheet 7

INVENTORS
RICHARD K. DAVIS
FRANCIS M. BAILEY
BY
ATTORNEY

INVENTORS
RICHARD K. DAVIS
FRANCIS M. BAILEY
BY
ATTORNEY

INVENTORS
RICHARD K. DAVIS
FRANCIS M. BAILEY

BY J T Cerfoott

ATTORNEY

United States Patent Office 3,169,242

Patented Feb. 9, 1965

3,169,242

IDENTIFICATION INTERROGATING SYSTEM

Richard K. Davis and Francis M. Bailey, Roanoke, Va., assignors to General Electric Company, a corporation of New York

Filed Mar. 19, 1963, Ser. No. 266,403
15 Claims. (Cl. 343—6.5)

This invention relates to a system for identifying objects passing, or being passed by, an interrogation device, it being unnecessary for actual motion to occur between the object and the device in order to effect identification.

More specifically, however, this invention relates to a system for identifying or classifying vehicles in a railroad yard or in a warehouse, each vehicle carrying a unique identification device that is passive in function, durable in most environments, susceptible to rugged operation, and economical in cost.

Very briefly, the invention consists of a system having a signal transmitting device, preferably operating at radio frequencies, a corresponding receiving device suitably arranged to cooperate with the transmitting device, a selective signal repeating device carried by the object to be identified, and logic circuits for correlating the identification of the object with the transmitted signal. Provision is also made to avoid false identification as a result of electrical interference by the use of timed signal relationship and positive signal references.

The system functions to transmit signals at preselected frequencies from the transmitter to the signal repeating devices, each of the latter being arranged to repeat only those signals having frequencies associated with its identity to the receiving device from which final identification is resolved by the logic circuits. In essence the transmitter generates a series of signals, each of a different frequency, in timed relationship over a predetermined frequency range which includes all of the frequencies to which any of the signal repeating devices is responsive. Within the operating range of the transmitter whenever an object is interrogated, each of its identifying frequencies is reflected by a signal into the receiving device in similar timed relationship so that identifying signals are received only when such timing coincidence occurs, no signal being reflected unless the signal repeating device of the object being interrogated includes a correspondiang frequency. In this manner the identity of the object is precisely established at the time of its interrogation, and susceptibility to interference causing false identification is materially reduced.

A feature of the system is the inclusion of detachably fixed, piezoelectric elements, each of a different preselected frequency response, in the signal repeating device whereby the identity of the object may be varied according to prearranged coding, thereby providing flexibility in the system to meet various operating requirements. These elements are commercially available in substantially stable values through a considerable frequency spectrum, are simple in construction, highly shockproof, temperature tolerant, relatively low in cost and in one form consist of small discs of lead zirconate-titanate.

It is an object of this invention to provide an identification system for objects carrying predetermined coding wherein interrogation is obtained by timed response to frequency identified signals associated with the identity of the object.

Another object of the invention is to provide an object identifying system wherein the object identifying medium is unaffected by rugged operating conditions and environment.

Still another object of the invention is to provide an improved signal responsive device for identifying objects wherein identification is obtained through positive operating signal means.

The invention is set forth with particularity in the appended claims. The principles and characteristics of the invention, as well as other objects and advantages, are revealed and discussed through the medium of the illustrative embodiments appearing in the specification and drawings which follow.

In the drawings:

FIG. 4 shows the symbols used in the detailed description of FIG. 5.

Figure 5:
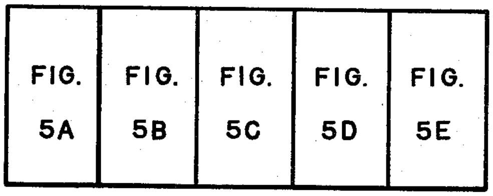
FIG. 5 shows how to put FIGS. 5*a* through 5*e* together.
Figure 5E:
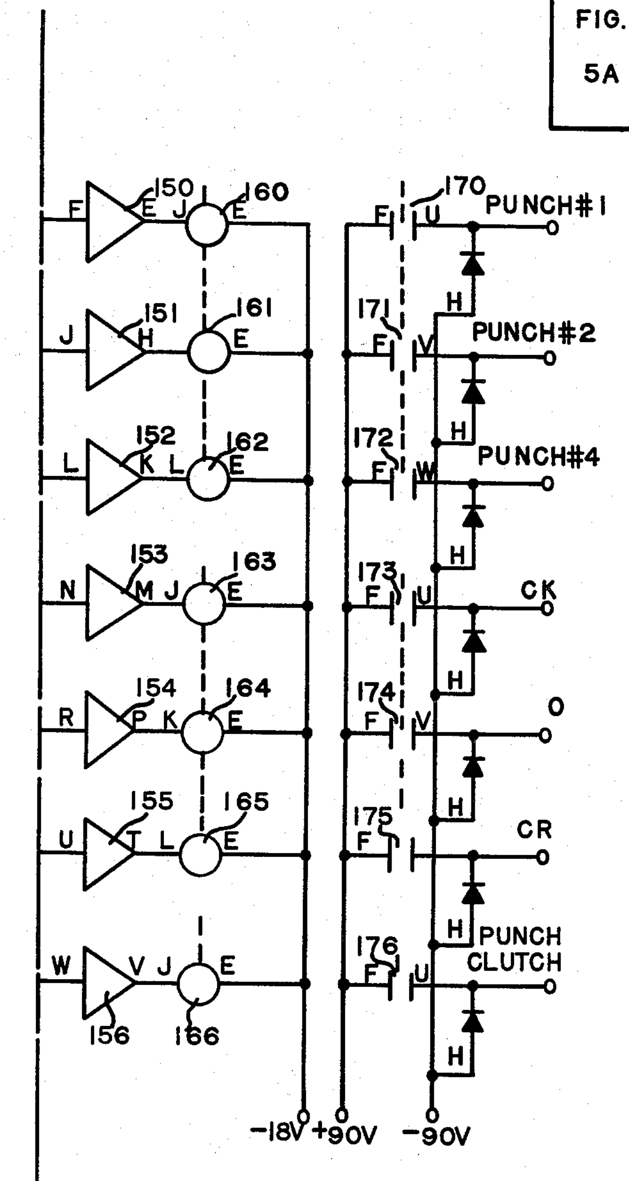
Figure 5A:
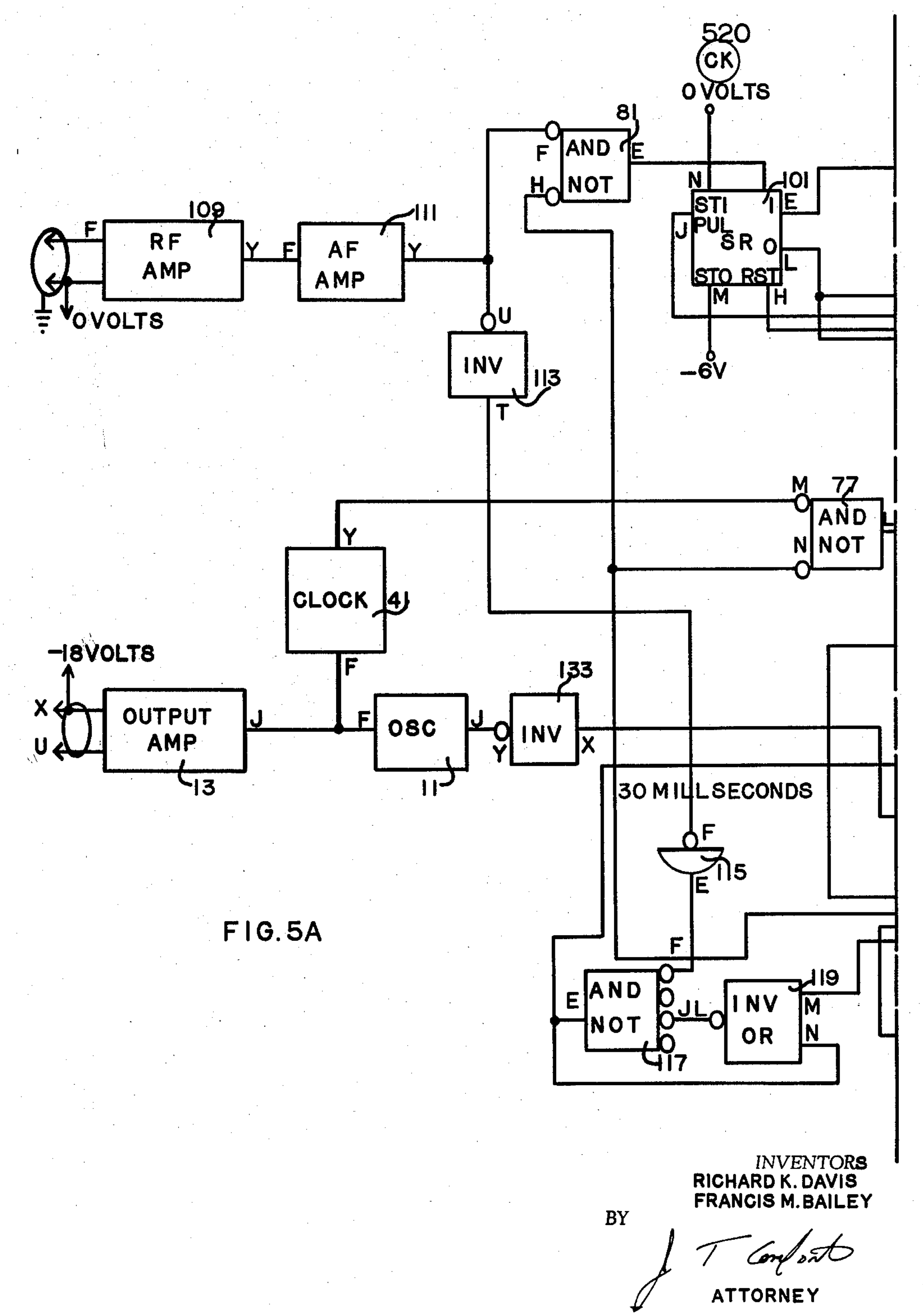
Figure 5B:
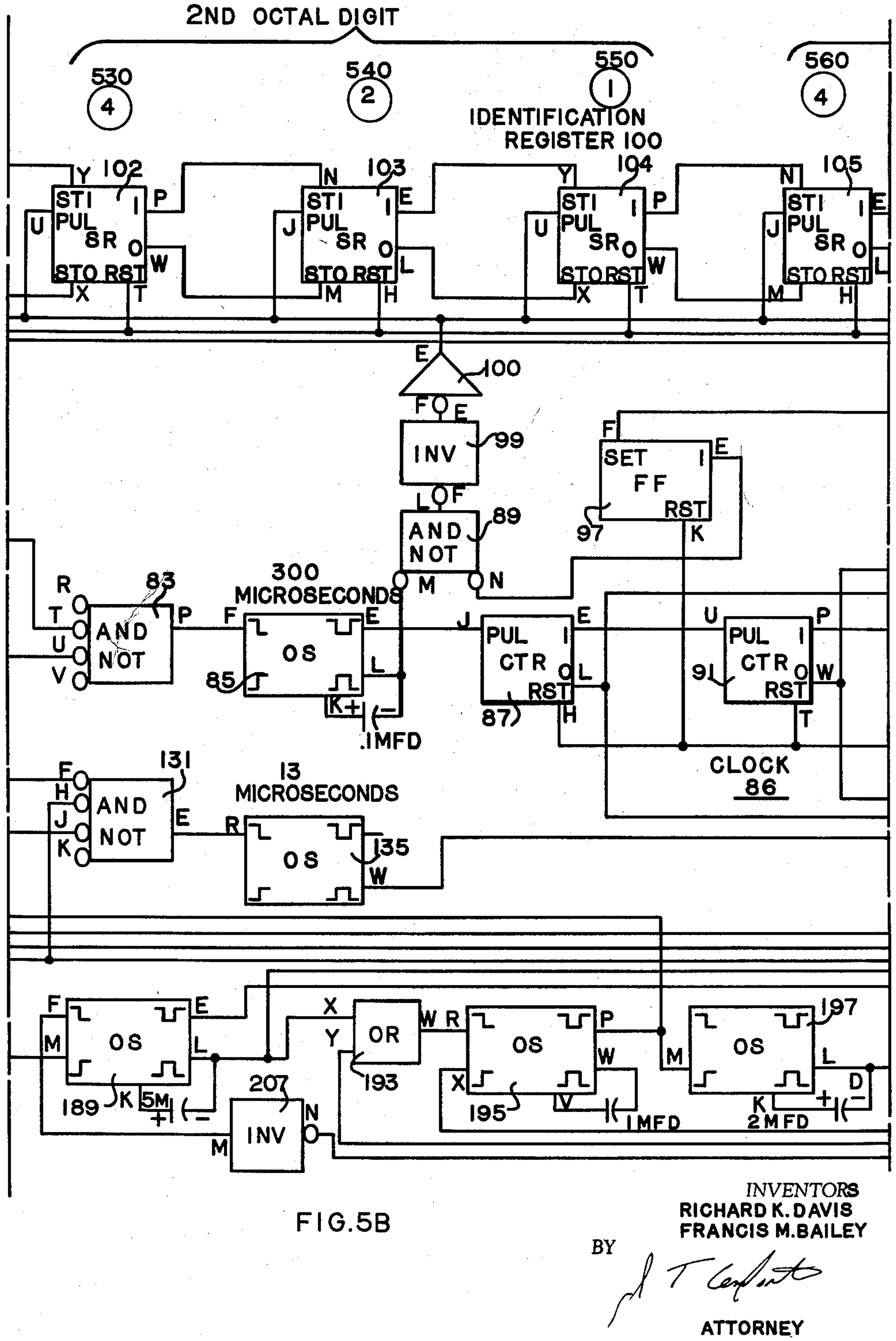
Figure 5C:
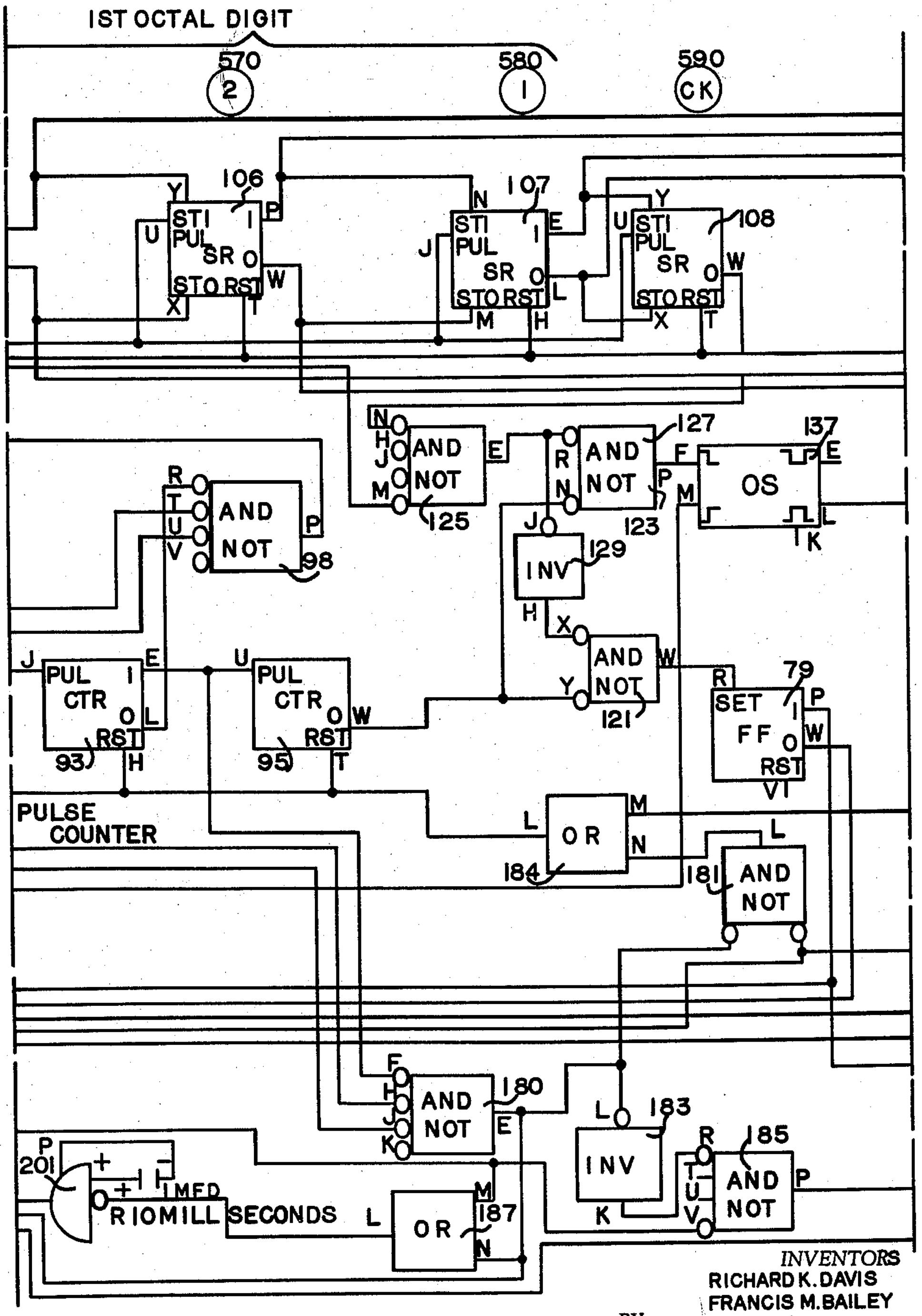
Figure 5D:
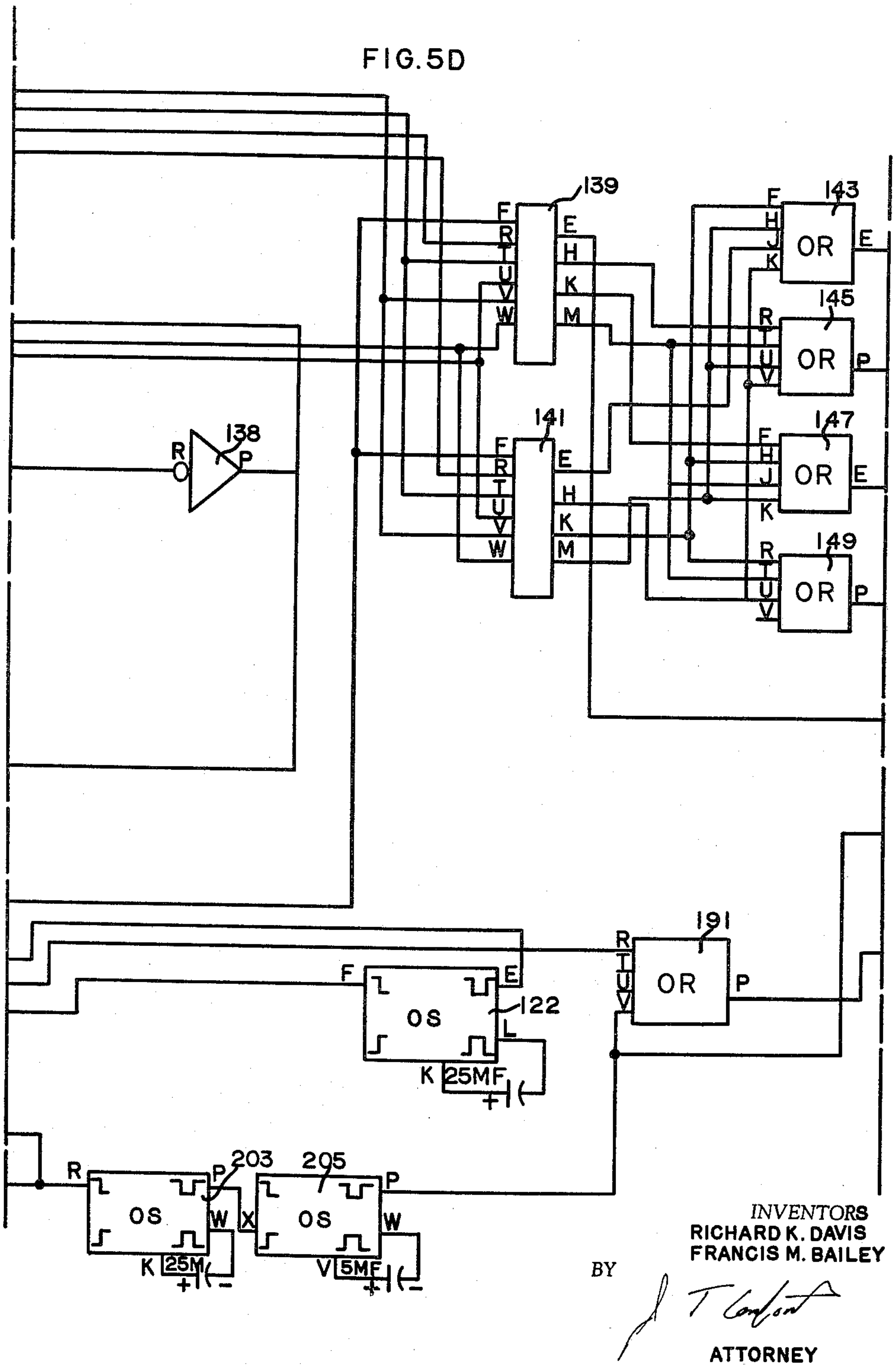

FIGS. 5*a* through 5*e* when put together as shown in FIG. 5 is a circuit diagram of an embodiment of this invention.

Figure 6:
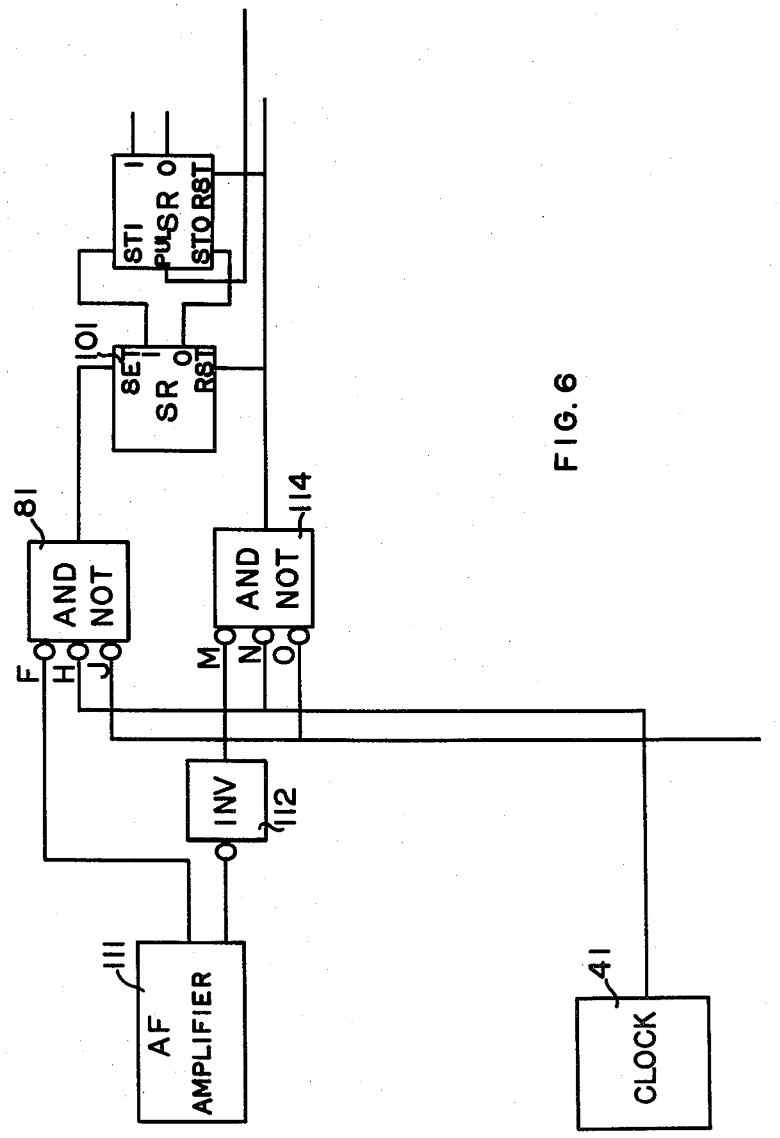

FIG. 6 is a circuit diagram of a modification of the time-frequency comparison circuit.

Figure 1:
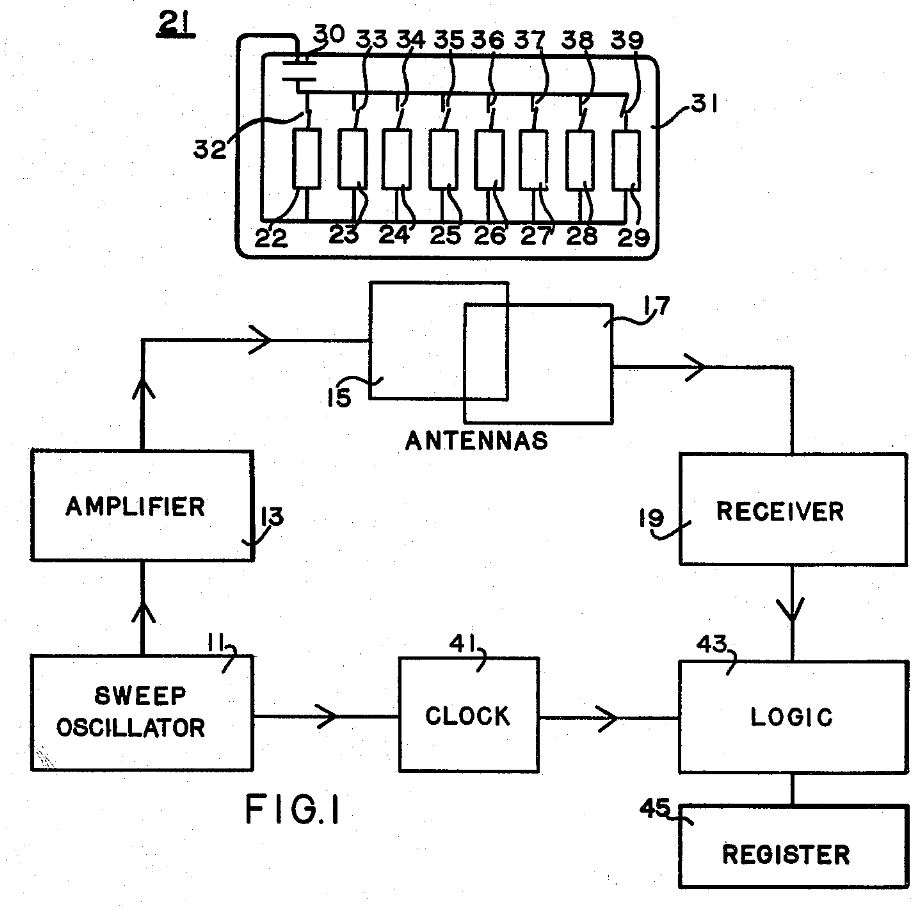
FIG. 1 is a block diagram of an identification system constructed in accordance with the principles of this invention.

Referring now to FIG. 1, sweep oscillator 11 sweeps over the frequencies from 510 kc. to 600 kc. A faraday shield may be used about the antennas to reduce radiated signals. Amplifier 13 amplifies the signal produced by sweep oscillator 11. Transmitting antenna 15 is a closed loop antenna for transmitting the signal produced by sweep oscillator 11 and amplified by amplifier 13.

A receiving antenna 17 is isolated from transmitting antenna 15 by overlapping the antennas in the same plane so that normally the receiving antenna 17 does not receive the signal transmitted from transmitting antenna 15. A length of 30 to 50 inches is a good length for the antennas.

Receiver 19 receives over the frequencies from 510 kc. to 600 kc.

The signal repeating device 21 has eight piezoelectric elements 22–29 connected in parallel through capacitor 30 to a pickup antenna 31. Each piezoelectric element 22–29 may be connected or disconnected to the pickup antenna 31 through switches 32–39, respectively. The piezoelectric elements have different preselected frequency responses as set forth in Table A:

TABLE A

| Piezoelectric element: | Frequency response |
|---|---|
| 22 | 520 |
| 23 | 530 |
| 24 | 540 |
| 25 | 550 |
| 26 | 560 |
| 27 | 570 |
| 28 | 580 |
| 29 | 590 |

The piezoelectric elements may be small discs of lead zirconate-titanate, or barium titanate. They may also be constructed of other materials which have a piezoelectric effect. Piezoelectric elements of lead zirconate-titanate have a resonant frequency tolerance within 0.1% from −40° C. to 85° C. The resonant frequency is estimated to change no more than ±0.2% in 10 years.

The piezoelectric elements of lead zirconate-titanate have a minimum impedance of approximately 15 ohms at resonance. At a nonresonance frequency, their impedance is of the order of 1000 ohms.

Each signal repeating device 21 therefore has a low impedance at the frequencies of the piezoelectric devices connected to the pickup antenna 31 and a high impedance at the other frequencies.

Figure 2:
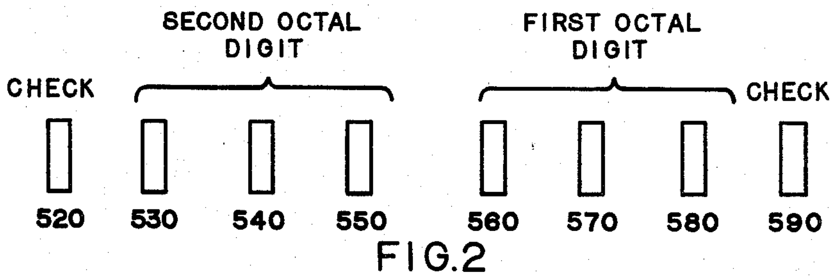
FIG. 2 shows typical code used in the detective signal repeating device carried by the object to be identified.

Each signal repeating device 21 is coded to represent a decimal number identifying the object to which the signal repeating device 21 is attached. FIG. 2 shows how eight piezoelectric elements might be coded to represent a decimal number to identify an object. Two piezoelectric elements are used as checks, and the other six are used to give two octal digits. The check is carried out by the 520 kc. and 590 kc. piezoelectric elements. Piezoelectric elements at 520 kc. and 590 kc. connected to the pickup antenna 31 in FIG. 1 indicate that the identity information is valid. The 530, 540 and 550 kc. piezoelectric elements provide the second octal digit; and the 560, 570 and 580 kc. piezoelectric elements provide the first octal digit. The piezoelectric elements are weighed in the following manner in the octal digits to indicate the number of each digit:

TABLE B

| Weight for the Digit | First Octal Digit Elements, kc. | Second Octal Digit Elements, kc. |
|---|---|---|
| 4 | 560 | 530 |
| 2 | 570 | 540 |
| 1 | 580 | 550 |

Thus, the combination of piezoelectric elements connected to the pickup antenna 31 in FIG. 1 indicates the number to be indicated by each signal repeating device. With two octal bits, the signal repeating device can indicate 64 numbers. For instance, with piezoelectric elements having a frequency of 580 kc. and 540 kc. connected to the pickup antenna, a decimal number 12 is indicated; and if the check piezoelectric elements having a frequency of 520 and 590 are also connected, the number is correct. The piezoelectric elements may be coded in any other desirable way, for instance, they may be coded in straight binary. The check bits insure that only identity information is read and that electrical noise is not erroneously read.

The receiver coil 17 in FIG. 1 overlaps the transmitter coil 15 somewhat, causing electromagnetic flux from the transmitter coil 15 to link the receiver coil 17 partly in one direction through the loop and partly in the opposite direction through the loop. The effect on the receiver coil 17 is that at any instant the net flux linking the receiver coil 17 and the transmitter coil 15 is zero, and no signal is produced in the receiver coil 15.

The clock 41 is driven by the sweep oscillator so that each frequency from 520 kc. through 590 kc. is produced at a predetermined period of time in synchronism with a clock pulse produced by the clock. Thus, a clock pulse will be produced for each frequency as shown in Table C.

TABLE C

| Frequency of signal produced by sweep oscillator: | Clock pulse |
|---|---|
| 590 | 1 |
| 580 | 2 |
| 570 | 3 |
| 560 | 4 |
| 550 | 5 |
| 540 | 6 |
| 530 | 7 |
| 520 | 8 |

The clock pulses are applied to the logic 43 at the same time that they are applied to the sweep oscillator.

The logic 43 accepts the pulses received by the receiver 19 at the predetermined frequencies determined by which piezoelectric elements 22–29 are connected to the specific pickup antenna 21 passing the antennas. The logic 43 compares each clock pulse with an output from the receiver 19 to determine if a pulse is received from the receiver 19 at the frequency corresponding to the specific clock pulse. If a comparison is carried out indicating that a pulse was received by the receiver at the proper time, a binary one is stored in a register 45; and if no comparison is carried out indicating that no pulse was received by the receiver at that particular time, a binary zero is stored in a register 45. This comparison is made for the eight bits of the identification number. The logic 43 then checks to make sure that the two check bits are present and then the identification number may be read into a memory, punched out on a paper tape and sent over communication lines to a central location. The logic 43 consists of comparison circuits to compare the output from the receiver 19 with the output from the clock 41. The output of the comparison is delivered to a standard register 45.

In areas of high electrical noise it may be desirable to employ the superheterdyne principle to give an acceptable signal to noise ratio. The signal from the sweep frequency oscillator (510 to 600 kc.) and from a 455 kc. oscillator are added producing a sweep frequency from 965 to 1055 kc. Then the signal from the receiver is subtracted from the 965 to 1055 kc. frequency. It can be seen that the difference is always 455 kc. The 455 kc. IF signal is passed through tank circuit filters so as to pick out only the desired signal frequency and reject all frequencies above and below the sidebands of the signal frequency. The relatively narrow bandpass of the 455 kc. filter will result in a significant noise reduction.

The distance from the transmitter-receiver antennas to the pickup antenna is largely a matter of size of the receiving and transmitting antennas and the pickup antennas. A range four to six inches is a good separating distance. A good rule of thumb is that the distance from the transmitter-receiver antennas to the pickup antennas is a maximum of about 3/2 times the width of a square pickup antenna or 3/2 times the diameter of a round antenna. The pickup antenna should pass in a plane parallel to the transmitter-receiver antennas for maximum signal, but can pass at an angle to the antennas with a corresponding decrease in received signal.

Figure 3:
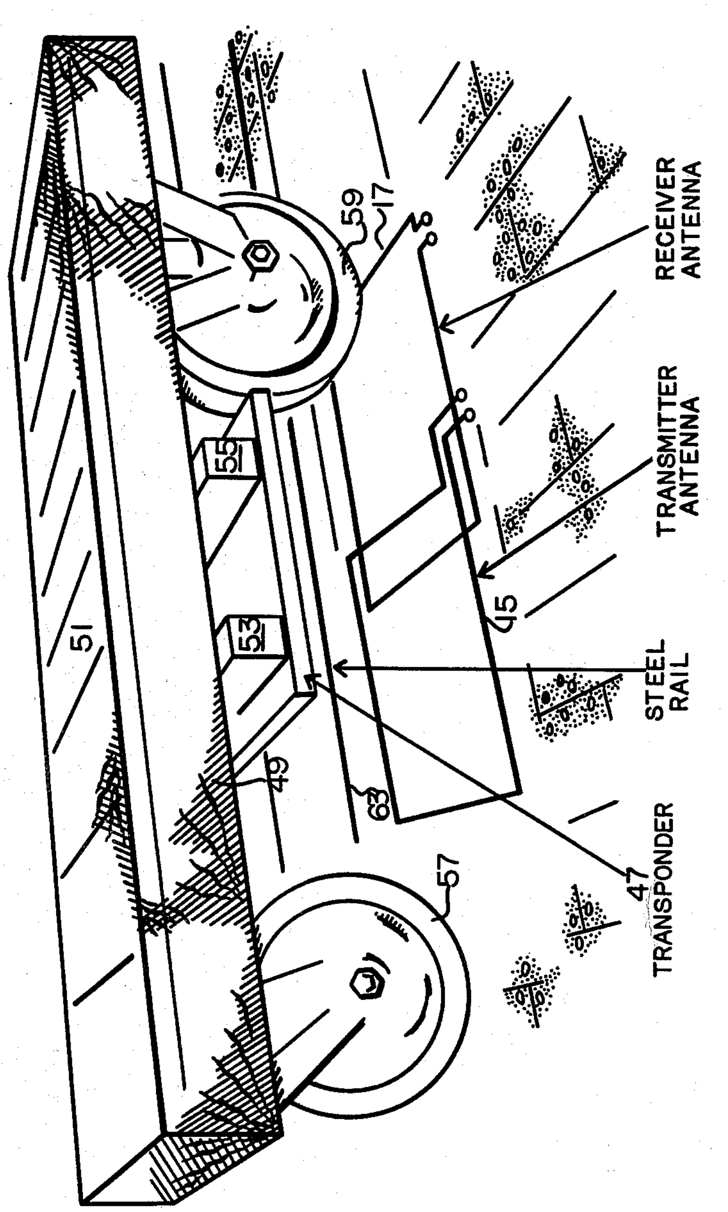
FIG. 3 shows the physical arrangement of the identification system used in a warehouse identification system.

FIG. 3 shows the pickup antenna and piezoelectric elements encased in a protective case 47 and attached to the floor of a warehourse truck 51 by two supports 53 and 55. The transmitter antenna 15 is encased in concrete partially overlapping the receiver antenna 17 also encased in concrete in the floor. The truck 51 is moved on its wheels 57 and 59 as a pin (not shown) is pushed down between the rails 63 to engage a moving chain (not shown). The signal repeating device 47 may be mounted on railroad cars in a similar manner with the transmitter-receiver antennas mounted between the railroad tracks or outside the tracks.

*Operation*

The signal repeating device 21 is attached to the object to be identified and is moved above the transmitting antenna 15 and the receiving antena 17. The identifying number for the object is selected by switching the number into the first and second octal digits. For instance, if the desired identifying number is 24, switches 33 and 37 are closed connecting the 570 kc. and 530 kc. piezoelectric elements 23 and 27 to the pickup antenna 31 along with the 520 kc. and 590 kc. piezoelectric elements 22 and 29.

The signal produced by the sweep oscillator 11 varying from 510 to 600 kc. in synchronism with the pulses generated by the clock as set forth in Table C is amplified by amplifier 13 and transmitted by transmitting antenna 15. The clock pulses, produced by the clock 41, synchronized with the transmitted variable frequency signal, are applied to the logic 43.

When the signal repeating identifying device 21 is brought near the transmitting antenna 15 and receiving antenna 17, the antennas are coupled at the frequencies of the piezoelectric elements connected to the pickup antenna 31. With the 520, 530, 570 and 590 kc. piezoelectric elements 22, 23, 27 and 29 connected to the pickup antena 31, the receiving antenna 17 and transmitting antenna 15 are coupled at the 520, 530, 570 and 590 kc. frequencies as the variable frequency signal is generated by the sweep oscillator 11. The receiver 19 receives pulses at 520, 530, 570 and 590 kc. at clock pulse time 1, 3, 7 and 8. The receiver 19 then produces output pulses at clock pulse time 1, 3, 7 and 8 time.

The logic 43 compares the pulses from the receiver 19 with the clock pulses from the clock 41. At clock pulse time 1, 3, 7 and 8, a comparison indicates that pulses are received from the receiver 19; and at clock pulse times 2, 4, 5 and 6, a comparison indicates that no pulses are received from the receiver 19. When a comparison indicates equality at clock pulse time 1, 3, 7 and 8, a binary one is stored in a register 45; and when a comparison indicates no equality at clock pulse time 2, 4, 5 and 6, a binary zero is stored in a register 45. After the comparison, the bits of the register 45 are set to the following states:

TABLE D

| Clock Pulse Time (Register Bit) | Binary Number | |
|---|---|---|
| 8 (520 kc.) | 1 | check digit. |
| 7 (530 kc.) | 1 | Second octal digit. |
| 6 (540 kc.) | 0 | |
| 5 (550 kc.) | 0 | |
| 4 (560 kc.) | 0 | First octal digit. |
| 3 (570 kc.) | 1 | |
| 2 (580 kc.) | 0 | |
| 1 (590 kc.) | 1 | check digit. |

The binary ones in clock pulse time 1 and 8 indicate that the check code has been read and is valid. The binary one at clock pulse time 7 of the second octal digit and the binary zeros at clock pulse time 6 and 5 of the second octal digit indicate that the second octal digit is a decimal 4. The binary one at clock pulse time 3 and the binary zeros at clock pulse time 3 and 1 of the first octal digit indicate that the first octal digit of the identification number is a decimal 2. The identification number of the object identified is therefore 24.

The identification number resting in the register may then be read directly, punched into paper tape, or communicated to a central control station. The next identification number may then be read.

*Symbols and Nomenclature*

In the following detailed description, the term "one signal" when used refers to a −6 volt signal and the term "zero signal" refers to 0 volt signal or ground potential.

The symbols used in FIG. 4A through 4L and described hereinafter are used in the detailed description of the identification system.

In all of the elements shown, input terminals are usually shown on the left side of the symbols and output terminals are shown on the right side of the symbols.

AMPLIFIER

FIG. 4A shows the symbol for the amplifier. A one signal on the input terminal will cause current to flow in a load connected between the output terminal and the negative power bus.

LOGIC AMPLIFIER

FIG. 4B shows the symbol for the logic amplifier or inverter amplifier. The signal applied to the input terminal is inverted and produced on the output terminal after amplification.

AND/NOT CIRCUIT

FIG. 4C shows the symbol for the AND/NOT circuit. Its operation is such that a zero signal on all input terminals causes a one signal to be produced on the output terminal. This unit may have two or more input terminals. Positive pulses received on all terminals are effectively the same as zero signals received and cause a one signal to be produced on the output terminal. If a one signal is applied to one or more input terminals, a zero signal is produced on the output terminal.

COUNTER

FIG. 4D shows the symbol for a counter bit. A one signal applied to the SET terminal sets the counter bit to one, so that a one signal appears at the "1" output terminal and a zero signal at the "0" terminal. This one signal at the "1" output terminal will be maintained after the set signal is removed and remains until a one signal is applied to the RST (reset) terminal, at which time the one signal at the "1" output terminal becomes a zero signal; and a one signal appears at the "0" output terminal. The counter bit will remain in this, the zero state, or reset state, until a one signal is again applied to the SET terminal. In addition, a positive pulse received on the PUL input terminal will complement the counter bit, changing the state of the counter bit from the previous state. The shift of the counter bit will occur on the positive going side of the input pulse. The "1" and "0" output terminals are always the inverse of each other unless a one signal is simultaneously applied to the SET and RST (reset) terminal, in which case, a zero output signal will be present on both output terminals.

INVERTER

FIG. 4E shows the basic symbol for the inverter. A one signal is produced on the output terminal if a zero signal is received on the input terminal and a zero signal is produced on the output terminal if a one signal is received on the input terminal. The small circle is added to the output terminal to indicate the inverted output signal.

INVERTING "OR" CIRCUIT

FIG. 4F shows the symbol for the inverting OR circuit. Its operation is such that one or more one signals applied to the input terminals will cause a zero signal to be produced on its output terminal. The small circle is added to the output terminal to indicate the inverted output signal.

ONE SHOT PULSE GENERATOR

FIG. 4G shows the symbol for one shot pulse generator. A negative going pulse or a negative going step change in a D.C. input to the upper input terminal, or a positive going pulse or a positive going step change in a D.C. input to the lower input terminal, will cause a pulse to be produced at the upper output terminal with a negative going leading edge and a pulse to be produced at the lower output terminal with a positive going leading edge. Both output pulses are available at the same time with a signal on either or both input terminals. The length in time of the output pulses may be adjusted by the capacitance of a capacitor connected to the one shot pulse generator.

"OR" CIRCUIT

FIG. 4H shows a symbol for an OR circuit. Its operation is such that a one signal on either input terminal will produce a one signal on the output terminal. This symbol may have two or more input terminals.

SHIFT REGISTER

FIG. 4I shows a symbol for a shift register bit. This circuit is similar to the counter bit shown in FIG. 4D and described above, except for the provision of the ST1 (steer 1) and the ST0 (steer 0) terminals. If a one signal is applied to the SET terminal, the shift register bit is set to one; and a one signal will appear at the "1" output terminal. This one signal will remain after the set signal is removed, with the shift register bit remaining set to one until it is reset. A one signal applied to the RST (reset) terminal will reset the shift register bit to zero, and a one signal signal will appear at the "0" output terminal. The shift register bit will remain reset until it is set to one again. If one signals are received simultaneously on both the RST and the SET terminals, a zero output signal will be present on both output terminals. In addition, if a one signal is applied to the ST1 (steer 1) terminal, a zero signal to the ST0 terminal and a positive pulse applied to the PUL terminal, the shift register bit will be set to one with a one signal appearing on the "1" output terminal. If a one signal is applied to the ST0 (steer 0) terminal, a zero signal to the ST1 terminal and a pulse applied to the PUL terminal, the shift register will be reset to zero with a one signal appearing on the "0" output terminal. The shift of signals from terminal to terminal occurs on the positive going side of the positive pulse applied to the PUL input terminal. The "1" and "0" output terminals are always the inverse of each other, unless a one signal is simultaneously applied to the ST1 and the ST0 terminals, in which case the output remains as it was before.

FLIP-FLOP RELAY

The symbol for a relay flip flop is shown in FIG. 4J. The contacts are normally open. If a one signal is applied to the HOLD input terminal, a one or zero signal applied to the IN input terminal has no effect and the relay flip flop remains in the condition it was before the one or zero signal was applied. When the HOLD input terminal has a zero signal applied thereto and a one signal is applied to the IN input terminal, the contacts are closed and a one signal appears on the output terminal. If a one signal is then applied to the HOLD terminal, the contacts will remain closed until the one signal is removed from the HOLD terminal. When the one signal is removed from the HOLD terminal and a zero signal is applied to the IN terminal, the contacts open and a zero signal appears at the OUT output terminal.

TIME DELAY

FIG. 4K shows the symbol for a time delay element. Its operation is such that a predetermined period of time after a one signal is removed from the input terminal, a one signal will appear on the output terminal.

RELAY COIL

FIG. 4L shows the symbol used for a coil of a relay. The relay coil is energized by applying a one signal to the coil.

*Detailed Description*

Referring now to FIG. 5, sweep oscillator 11 sweeps the frequency range from approximately 510 kc. to 600 kc. at every 20 milliseconds. Thus, as shown in FIG. 6, at the beginning it sweeps through 600 kc.; and at approximately 2 millisecond increments, the oscillator sweeps through 590 kc., 580 kc., 570 kc., 560 kc., 550 kc., 540 kc., 530 kc., 520 kc., 510 kc. and then starts over again at 600 kc. Output amplifier 13 responds to the signal produced by sweep oscillator 11 delivering the 600 to 510 kc. signal on the output antenna 15 in FIG. 1.

CLOCK PULSES

The output from oscillator 11 in FIG. 5 is also applied to the clock 41. The clock 41 is similar to the signal repeating device 31 shown in FIG. 1 with every piezoelectric element connected in the circuit so that one signals are produced by the clock 41 at each of the eight frequencies as shown in Table C during the 20 millisecond sweep cycle. Thus, as shown in Table C, clock pulse 1 is produced at 590 kc., clock pulse 2 at 580 kc., clock pulse 3 at 570 kc., clock pulse 4 at 560 kc., clock pulse 5 at 550 kc., clock pulse 6 at 540 kc., clock pulse 7 at 530 kc. and clock pulse 8 at 520 kc. The clock pulses produced are one signals.

The clock pulses are applied to terminal N of AND/NOT circuit 77. Terminal N of AND/NOT 77 at this time has a zero signal applied thereto from terminal P of the one output terminal P of flip flop 79, as flip flop 79 is reset to zero at this time. The one output terminal P of flip flop 79 applies a zero signal to terminal H of AND/NOT circuit 81 at this time.

Thus, for clock pulses 1 through 8, a negative signal is applied to terminal N of AND/NOT circuit 77 causing AND/NOT circuit 77 to apply a zero signal to terminal T of AND/NOT circuit 83. AND/NOT 83 has a zero signal applied to terminal U from one shot pulse generator 195 at this time. AND/NOT circuit 83 thereupon at clock pulse time 1 through 8 applies a one signal to terminal F of one shot pulse generator 85 causing one shot pulse generator 85 to apply a one signal to terminal J of counter bit 87 and applying a zero signal to terminal M of AND/NOT circuit 89. The one signal applied to the J terminal of counter bit 87 complements counter bit 87 to one, assuming that the counter bit 87 has been reset to zero before. Assume that counter bits 91, 93 and 95 are also reset to zero. The count of one in the counter indicates that the one clock pulse has been received. A zero signal is also applied to terminal N of AND/NOT circuit 89 at this time as flip flop 97 is reset to zero. AND/NOT circuit 89, with zero signals applied to terminals N and M, produces a one signal on output terminal K which is inverted to a zero signal by inverter 99, inverted back to a one signal and amplified by inverting amplifier 101 and applied to the PUL input terminals of shift register bits 101 through 108. 300 microseconds later the zero signal from terminal L of one shot 85 goes negative, so that the one signal applied to the PUL input terminals of shift register bits 101 through 108 goes positive. The effect of the positive going signal applied to the PUL terminals depends on the contents of the shift register bits and the signal received by AF amplifier 109 as described below.

IDENTITY SIGNALS

Depending on what piezoelectric elements are connected to the pickup antenna of the signal receiving device 31 in FIG. 1, signals will be received by the RF amplifier 109 and amplified by the AF amplifier 111. Assume for the purposes of this description, that a signal is received by the RF amplifier 109 corresponding to a 590 kc. signal at clock pulse time 1, which is amplified by the AF amplifier 111 and applied as a zero signal to terminal F of AND/NOT circuit 81. As AND/NOT circuit 81 has a zero signal applied to terminal H at this time, AND/NOT circuit 81 at clock pulse time 1 therefore applies a one signal to the SET terminal of shift register 101 to set shift register bit 101 to 1.

The zero signal at clock pulse time 1 from the AF amplifier 111 which is applied to terminal F of AND/NOT circuit 81 is also inverted to a one signal by inverter 113, inverted to a zero signal by time delay 115 and applied to terminal F of AND/NOT circuit 117 for 50 milliseconds. The effect of this signal will be described later with relation to the reset of the system.

READ-IN OF IDENTITY SIGNALS TO IDENTIFICATION REGISTER

Shift register bit 101 set to one applies a one signal to the ST1 terminal of shift register bit 102 and a zero signal to the ST0 terminal of shift register bit 102. Shift register bit 101 continually has a zero signal applied to its ST1 terminal and a one signal to its ST0 terminal.

Therefore, 300 microseconds after clock pulse time 1, the positive going signal applied to the PUL terminals of shift registers 101 through 108 causes shift register bit 101 to be reset to zero and shift register bit 102 to be set to one.

Assume that the identification number being reset is that shown in Table D, column 5. Referring now to Table D, at clock pulse time 2, a binary zero signal is again read as the 580 kc. piezoelectric element is connected to the pickup antenna applying a one signal to terminal F of AND/NOT circuit 81 to cause AND/NOT circuit 81 to produce a zero signal which is applied to the set input terminal of shift register bit 101, so that shift register bit 101 remains reset to zero.

Therefore, at clock pulse time 2, the 590 kc. binary one signal is indicated by shift register bit 102 set to one and the 580 kc. signal is indicated by shift register bit 101 being reset to zero. After 300 microseconds, determined by the pulse width of the zero signal from terminal L of one shot pulse generator 85, a positive going signal is applied to the PUL input terminals of shift register bits 101–108. Shift register bit 102, set to one, applies a one signal to the ST1 terminal of shift register bit 103 so that the positive going signal applied to the PUL terminal of shift register bit 103 causes shift register bit 103 to be set to one. Shift register bit 101, reset to zero, applies a one signal to the ST0 terminal of shift register bit 102 so that the positive going signal applied to the PUL input terminal causes shift register bit 102 to be reset to zero. Shift register bit 101, with a one signal applied to its ST0 terminal, is reset to zero. Therefore, 300 microseconds after clock pulse 2, shift register bits 101 and 102 are reset to zero and shift register bit 103 is set to one.

According to Table D, the 570 kc. piezoelectric element is connected to the pickup antenna so that a signal is received by the RF amplifier 109 at clock pulse time 3 and the AF amplifier 111 applies a zero signal to terminal F of AND/NOT circuit 81 at clock pulse time 3 so that AND/NOT circuit 81 applies a one signal to the set input terminal of shift register bit 101 and shift register bit 101 is set to one. At clock pulse time 3, the shift register bit 101 is set to one, shift register bit 102 is reset to zero and shift register bit 103 is set to one. 300 microseconds later, the positive going signal is applied to the PUL terminals of shift register bits 101 to 108. Shift register bit 103, set to one, applies a one signal to the ST1 terminal of shift register bit 104, shift register bit 102, set to zero, applies a one signal to the ST0 terminal of shift register bit 103 and shift register bit 101, set to one, applies a one signal to the ST1 terminal of shift register bit 102. Shift register bit 101 has a one signal applied to the ST0 terminal as is the case constantly. Therefore, the positive going signal to the PUL input terminals of shift register bits 101 through 108 resets shift register bit 101 to zero, sets shift register bit 102 to one, resets shift register bit 103 to zero and sets shift register bit 104 to one.

Each clock pulse from the clock 41, after passing through the logic of AND/NOT circuit 77, AND/NOT circuit 83 and one shot 85, causes a count of one to be recorded in the clock pulse counter 86. Thus, after the third clock pulse, counter bits 87 and 91 are set to one and counter bits 93 and 95 remain reset to zero, indicating a binary count of three.

The other binary one and binary zero signals corresponding to the piezoelectric elements connected to the pickup antenna as indicated in Table D are read into the identification shift register 100 serially until all eight binary bits have been read into the identification shift register 100. At that time, shift register bit 101 is set to one as indicated in Table E.

The 7 clock pulse causes the contents of shift register bits 101–107 to be shifted to the right, as described, to shift register bits 102–108. After the 7 clock pulse, the clock pulse counter has counted to seven with counter bits 87, 91 and 93 set to one and counter bit 95 reset to zero. Counter bits 87, 91 and 93, set to one, apply zero signals to all of the terminals of AND/NOT 98 so that AND/NOT 98 causes a one signal to set flip flop 97 to one. Flip flop 97, set to one, applies a one signal to terminal N of AND/NOT 89 so that the 8 clock pulse cannot get through AND/NOT 89. This is necessary to insure that the identification is shifted into proper shift register bits.

CHECK OF IDENTITY

After 8 time, the counter has counted to 8. Counter bits 87, 91 and 93 are reset to zero and counter bit 95 is set to one. Counter bit 95, set to one, causes a zero signal to be produced from its zero output terminal W and applied to terminal Y of AND/NOT circuit 121 and terminal N of AND/NOT circuit 123. After all eight bits of identity 1 is stored in the shift register bits 101 through 108, the identity being as indicated in Table E, it should be noted that shift register bits 101 and 108 are set to one. The setting of the other shift register bits will be referred to later on. Shift register bits 101 and 108, set to one, produce zero signals on their zero output terminals, applying zero signals to terminals N and M of AND/NOT circuit 125. AND/NOT circuit 125 thereupon applies a one signal to terminal R of AND/NOT circuit 127. The one signal produced by AND/NOT circuit 125 is also inverted by inverter 129 and applied as a zero signal to terminal X of AND/NOT circuit 121.

If both or only one shift register bits 101 or 108 remains reset to zero, a one signal is applied to either one or both of the input terminals to AND/NOT 125, applying a zero signal to terminal R of AND/NOT 127. Then, after the counters have counted to eight with counter bit 95 set to one, a zero signal is applied to terminal N of AND/NOT 127. AND/NOT 127 thereupon produces a one signal, causing one shot pulse generator 137 to produce a zero signal which is inverted by inverting amplifier 138 and applied to all of the shift register bits, counter bits, and the flip flops to reset them to zero. This indicates that nothing was read which was proper. Only if both shift register bits 101 and 108 are set to one are zero signals applied to both terminals of AND/NOT circuit 125, causing AND/NOT circuit 125 to produce a one signal which is inverted to a zero signal and applied to terminal X of AND/NOT circuit 121 so that flip flop 79 can be set to one, indicating that a proper number was read in.

TABLE E

| Shift Register | Frequency Bit, kc. | Set to Binary Number |
|---|---|---|
| 101 | 520 | 1 |
| 102 | 530 | 1 |
| 103 | 540 | 0 |
| 104 | 550 | 0 |
| 105 | 560 | 0 |
| 106 | 570 | 1 |
| 107 | 580 | 0 |
| 108 | 590 | 1 |

TABLE F

| Shift Register | Frequency Bit, kc. | Set to Binary Number | After Shift | | |
|---|---|---|---|---|---|
| | | | 1 | 2 | 3 |
| 101 | 520 | 1 | 0 | 0 | 0 |
| 102 | 530 | 1 | 1 | 0 | 0 |
| 103 | 540 | 0 | 1 | 1 | 0 |
| 104 | 550 | 0 | 0 | 1 | 1 |
| 105 | 560 | 0 | 0 | 0 | 1 |
| 106 | 570 | 1 | 0 | 0 | 0 |
| 107 | 580 | 0 | 1 | 0 | 0 |
| 108 | 590 | 1 | 0 | 1 | 0 |

READ OUT OF THE FIRST OCTAL DIGIT

The two octal digits are read an octal digit at a time. The three bits in the shift registers 105, 106 and 107 are read out first and then the shift register 100 is shifted three times and the other octal digit is read out. The first punch-out is indicated by the clock pulse counter 86 counting to eight with counter bit 95 set to one, applying a zero signal to terminal Y of AND/NOT circuit 121. A zero signal is also applied to terminal X of AND/NOT circuit 121 at this time, as the one and eight shift register bits, 101 and 108, are set to one as described above. Thus, AND/NOT 121 produces a one signal which sets flip flop 79 to one causing a zero signal to be applied to terminal M of one shot 189, causing one shot 189 to produce a one signal which is passed by OR circuit 191 to energize relay coil 166 to cause the punch clutch to be energized and punch the number indicated in the 5, 6 and 7 shift register bits 105–107. The one signal from terminal P of flip flop 99 is applied to terminal H of AND/NOT 81 and terminal N of AND/NOT 77. Thus, zero signals applied to terminal F of AND/NOT 81 and terminal M of AND/NOT 77 have no effect. In this manner, noise cannot cause a false signal to disturb the clock pulse counter 86 of the identification register 100.

READ OUT OF THE SECOND OCTAL DIGIT

The zero signals from terminal L of one shot 189 is applied to terminal N of AND/NOT circuit 181. Terminal N of AND/NOT circuit 181 receives a zero signal at this time from AND/NOT circuit 180 as AND/NOT 180 has a one signal applied to terminals H and J at this time as shift register bits 87 and 91 are set to zero. AND/NOT 181 then produces a one signal which is passed by OR circuit 184 and applied to the reset terminals of the counter bits 87, 91, 93 and 95 resetting counter bit 95 to zero. Counter bits 87, 91 and 93 remain reset to zero. Flip flop 97 is also reset to zero. Going back to one shot pulse generator 189, the zero signal from terminal L is also passed through OR circuit 193 and applied to terminal R of one shot 195. One shot 195 thereupon applies a one signal to terminal U of AND/NOT 83 and to terminal M of one shot 197, which goes positive after a 10 microsecond delay. Terminal T of AND/NOT 83 has a zero signal applied thereto at this time, as shift register bit 79 has been set to one and remains set to one as the signal which reset the clock pulse counter passed through OR circuit 184 and was not applied to the identification shift register 100 or flip flop 79. Shift register bit 79, set to one, applies a one signal to terminal N of AND/NOT circuit 77 so that AND/NOT circuit 77 applies a zero signal to terminal T of AND/NOT circuit 83.

AND/NOT circuit 83 then applies a one signal to terminal F of one shot 85 so that one shot 85 applies a zero signal to terminal M of AND/NOT circuit 89. Terminal N of AND/NOT circuit 89 has a zero signal applied thereto at this time as flip flop 97 has been reset. AND/NOT circuit 89 thereupon produces a one signal which is inverted to a zero signal by inverter 89, inverted back to a one signal by inverting amplifier 100 and applied to the PUL input terminals of shift registers 101 through 108. 300 microseconds later as the one signal goes positive, the contents of shift register bits 101 through 108 are shifted one shot register bit to the right. The contents of shift register bits 101–108 after the first shift are shown in Table F.

The one signal from terminal E of one shot pulse generator 85 causes a count of one to be recorded in the clock pulse counter 86 with counter bit 87 set to one.

The one signal from terminal P of one shot 195 is also applied to terminal M of one shot 197 to produce on the positive going side of the signal a zero signal which is applied to terminal V of AND/NOT 185. A one signal is applied to terminal R of AND/NOT 185 at this time so this has no effect. The zero signal is also passed by OR circuit 187; and after being delayed for 10 milliseconds by delay circuit 201 and inverted to a one signal, it is applied to terminal X of one shot 195. One shot 195 produces another signal to again cause a right shift to be effected for the second time and a count of two to be indicated in the counter. The shift will be as indicated in Table F for the second shift, counter bit 87 reset to zero and counter bit 91 set to one. The one signal from terminal P of one shot 195 will also go again through one shot 197 and pass through OR circuit 187; and after a delay of 10 milliseconds and inversion by time delay 201, will again be applied to terminal X of one shot 195 to cause a third shift. After the third shift, counter bit 87 will be set to one, counter bit 91 set to one and counter bit 93 set to zero. Counter bit 93, set to zero, will apply a zero signal to terminal F of AND/NOT circuit 180; counter bit 91, set to one, will apply a zero signal to terminal H of AND/NOT 180; and counter bit 87, set to one, will apply a zero signal to terminal J of AND/NOT 180. AND/NOT 180 then produces a one signal which is inverted by AND/NOT 183 and applied to terminal R of AND/NOT 185 as a zero signal. The one signal from AND/NOT 180 is also passed through OR circuit 193 and applied to terminal R of one shot 195 without a delay, causing one shot 195 to apply a one signal to terminal M of one shot 197. One shot 197 applies a zero signal to terminal V of AND/NOT circuit 185.

AND/NOT 185, with zero signals applied to both terminals, applies a one signal to terminal F of one shot 189, causing one shot 189 to apply a one signal through OR circuit 191 and amplifier 156 to energize relay coil 166. Relay coil 166, energized, closes contacts 176 to energize the punch clutch to punch out the number in shift register bits 105–107.

AND/NOT circuit 185 also applies a one signal to terminal R of one shot 203, causing one shot 203 to apply a one signal to terminal X of one shot 205. 100 microseconds later on, the positive going side of the one signal applies a one signal through amplifier 155 energizing relay coil 165, closing contacts 175 to energize the CR punch. The one signal from one shot 205 is also passed by OR circuit 191 to energize relay coil 166, closing contacts 176 to energize the punch clutch, causing the carriage return to be energized.

The punch-out is accomplished before the one signal from one shot 85 goes positive due to the zero signal applied to terminal U of AND/NOT 83 from one shot 195. Therefore, the resulting shift pulse applied to the shift registers 101–108 has no effect.

RESET

The zero signal from the AF amplifier at one clock pulse time is inverted to a one signal by inverter 113 and applied to time delay 115. Time delay 115 then applies a zero signal to terminal F of AND/NOT 117 for a period of 50 milliseconds.

At eight clock pulse time when flip flop 79 is set to one, as hereinbefore described, the one signal applied to terminal F of one shot 122 causes a one signal to be applied to terminal M of inverting OR 119. Inverting OR 119 then applies a zero signal to terminal J of AND/NOT 117 so that AND/NOT 117 applies a one signal to terminal N of inverting OR 119 and to terminal F of AND/NOT 131.

Inverting OR 119, with a one signal applied to terminal N, keeps on applying a zero signal to terminal J of AND/NOT 117 even when the one signal from one shot 122 goes positive.

Oscillator 11, during the sweep of the frequencies, produces a zero signal which is inverted to a one signal and applied to terminal J of AND/NOT 131. AND/NOT 131 produces a zero signal during the sweep of the frequencies. The one signal applied to terminal F of AND/NOT 131 for 50 milliseconds keeps AND/NOT 131 producing a zero signal for 50 milliseconds.

At the end of each sweep, oscillator 11 produces a one signal which is inverted to a zero signal by inverter 133 and applied to terminal J of AND/NOT 131. During the 50 millisecond delay, a zero signal applied to terminal J has no effect; and oscillator 11 will make subsequent sweeps until a sweep ends after the 50 millisecond delay. At the end of 50 milliseconds, the zero signal from time delay 115 goes negative, applying a one signal to terminal F of AND/NOT 117. AND/NOT 117 then applies a zero signal to terminal F of AND/NOT 131. A subsequent one signal at the end of a sweep by oscillator 11 is inverted to a zero signal by inverter 133 and applied to terminal J of AND/NOT 131.

AND/NOT 131 then applies a one signal to one shot 135, causing one shot 135 to apply a zero signal to one shot 137. One shot 137 then produces a zero signal, inverted to a one signal by inverting amplifier 138 and applied to the reset terminals of shift register bits 101–108 to reset them to zero. The one signal is also applied to the reset terminals of flip flops 79 and 97, and counter bits 87, 91, 93 and 95 to reset them to zero.

The 50 millisecond delay is to allow time for the contents of the identification register to be punched out in two punches.

TIME FREQUENCY COMPARISON

The clock 41 produces clock pulses in synchronism with the transmission of the frequencies corresponding to the eight piezoelectric elements which may be connected to the pickup antenna. Thus, eight clock pulses are produced by the clock 41. The clock pulses are used to insure that only signals received by AF amplifier 111 at clock pulse times result in an identification number being recorded in the identification register 100.

The comparison is effected between the received signal at RF amplifier 109 and the clock pulse by the application of a one or zero signal to the set terminal of shift register bit 101 to set it to one or leave it at zero and the subsequent application of a positive going signal to the PUL terminal of shift register 101 to shift the contents to shift register 102. The positive going signal is applied to the PUL terminal 300 microseconds after the corresponding frequency is transmitted to allow for the delay in reflection back to the receiver and to allow for variations in the signal width of the reflected back signal.

The comparison can be carried out in other ways. For instance, the clock pulse, as a zero signal, could be applied directly to a terminal of the AND/NOT circuit 81 so that only if a signal was received by RF amplifier 109 at the same time that a clock pulse was applied to AND/NOT 81 would a set signal be applied to the set terminal of shift register bit 101.

Another way would be to have an AND/NOT circuit to provide a one signal to reset shift register bit 101 to zero when no signal is received by RF amplifier 109 at a clock pulse time as shown in FIG. 6. Accordingly, the signal from AF amplifier 111 in addition to being applied to terminal F of AND/NOT 81, after inversion is also applied to terminal M of AND/NOT 114. The clock pulses from clock 41 are applied to terminal N of AND/NOT 114.

Assume that flip flop 79 in FIG. 5 is reset to zero, applying a zero signal to terminals J and O of AND/NOTS 81 and 114, respectively.

At a clock pulse time, clock 41 applies a zero signal to terminals H and N of AND/NOTS 81 and 114 respectively. If no signal is received at that particular clock pulse time, indicating that the corresponding piezoelectric element has not been connected to the pickup antenna, RF antenna applies a one signal to terminal F of AND/NOT 81; and after inversion to a zero signal by inverter 112, applies a zero signal to terminal M of AND/NOT 114. AND/NOT 114 then applies a one signal to the RST terminal of shift register bit 101 to reset it to zero, indicating a binary zero at that particular clock pulse time.

The inverse happens when a signal is received at a clock pulse with shift register bit 101 set to one, indicating a binary one.

If a signal is received by AF amplifier 111 at any other time than at a clock pulse time, the zero signal applied to terminal F of AND/NOT 81 has no effect as the clock 41 applies a one signal to terminal H of AND/NOT 81, blocking the effect of the zero signal to terminal F.

In summary, a new and improved identification interrogating system has been described. The objects being identified carry predetermined coding and the interrogation of the predetermined coding is obtained by timed response to frequency identified signals associated with the identity of the object. The object identifying medium associated with each object is unaffected by rugged operating condition and environment.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An identification interrogation system comprising a signal repeating device associated with each object to be identified having a plurality of selectively connected piezoelectric elements, each of a different preselected frequency response, and means for interrogating said signal repeating device to obtain a response of timed frequency identified signals.

2. An identification interrogation system comprising a signal repeating device associated with each object to be identified having a plurality of selectively connected piezoelectric elements, each of a different preselected frequency response, means for interrogating said signal repeating device with a varying time and frequency signal, and means for receiving reflected frequency identified signals from said signal repeating device in a time identifying sequence.

3. An identification system comprising a signal repeating device associated with each object to be identified having a plurality of selectively connected piezoelectric elements, each of a different preselected frequency response, means for transmitting a variable frequency signal in a predetermined time relationship, and means for receiving the frequency identified signals repeated from said signal repeating device in a time identified relationship.

4. An identification system for identifying objects comprising a signal repeating device associated with each object to be identified having a plurality of selectively connected piezoelectric elements, each of a different preselected frequency response, means for producing timing pulses, means for transmitting a signal having a plurality of different frequency responses in synchronism with the production of predetermined ones of said timing pulses, and means for receiving a reflected signal from said signal repeating device having frequency responses corresponding to the frequency responses of the piezoelectric elements connected to said signal repeating device when said frequency responses are received in synchronism with the production of predetermined ones of said timing pulses.

5. In an identification interrogating system including a plurality of objects to be identified, signal generating means for providing signals over a predetermined range of frequencies, timing means for controlling said generating means to provide signals at timed intervals, each said object having one or more piezoelectric elements with each element being responsive to a signal frequency within the range of said generating means, the identity of each object being related to the aggregate response of all of its elements, signal receiving means, and signal collecting means coacting with the elements of each object for reflecting signals from said generating means to said receiving means under control of said timing means and the said elements whereby each said object is identified.

6. In an identification interrogating system including a plurality of objects to be identified, each said object having one or more piezoelectric elements with each element being responsive to an electrical signal of a preselected frequency and the identity of each object being related to the aggregate frequency response of its said elements, signal generating means for providing signals over the frequency range of all said elements, signal receiving means, and signal collecting means associated with the elements of each object for reflecting signals from said generating means to said receiving means according to the aggregate frequency response of said elements whereby each said object is identified.

7. In an identification interrogation system including a plurality of objects to be identified, signal generating means for providing signals over a predetermined range of frequencies, means responsive to said signal generating means for providing signal timed intervals, each said object having one or more piezoelectric elements with each element being responsive to a signal frequency within the range of said generating means, the identity of each object being related to the response of all of its elements, signal receiving means, and signal collecting means coacting with the elements of each object for reflecting signals from said generating means to said receiving means at said timed intervals under the control of said elements whereby each said object is identified.

8. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, and means for comparing the reflected signals with the timed signals to identify the object.

9. In an identification interrogating system including a plurality of objects to be identified, signal generating means for providing signals over a predetermined range of frequencies, means for providing timed signals in synchronism with the signal from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, and means for comparing the reflected signals with said timed signals after a predetermined period of time to identify the object.

10. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, and means for storing said reflected identifying signals under the control of said timed signals.

11. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, means for storing said reflected identifying signals under the control of said timed signals, and means for checking said reflected identifying signals.

12. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, means for storing said reflected identifying signals under the control of said timed signals, means for checking said reflected identifying signals, and means responsive to a proper check for closing said storage means.

13. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, means for storing said reflected identifying signals under the control of said timed signals, means for checking said reflected identifying signals, and means responsive to a proper check by said checking means for reading said identifying signals out of said storage means.

14. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, receiving means, signal collecting means coacting with the elements of each object for reflecting signals from said generating means to said receiving means under the control of said elements, means for storing said reflected identifying signals under the control of said timed signals and means responsive to the receipt of said reflected signals for reading said reflected signals out of said storage means after a predetermined period of time.

15. In an identification interrogating system including a plurality of objects to be identified, signal generating means for providing signals over a predetermined range of frequencies, means for providing timed signals in synchronism with the signals from said signal generating means, each said object having one or more piezoelectric elements with each element being responsive to a signal frequency within the range of said generating means, the identity of each object being related to the response of all of its elements, signal collecting means coacting with the elements of each object for reflecting signals from said generating means to said receiving means under the control of said elements, means for storing said reflecting identifying signals under the control of said timed signals, means for checking said reflected identifying signals, means for counting said reflected identifying signals stored in said storage means, means responsive to a proper check of said reflected identifying signals and a count to a predetermined number of said reflected signals for reading out a first portion of said reflected identifying signals, and means responsive to the read-out of the first portion of said identifying signals for reading out a second portion of said identifying signals.

No references cited.

CHESTER L. JUSTUS, *Primary Examiner.*